United States Patent
Hossain et al.

(10) Patent No.: US 12,353,428 B2
(45) Date of Patent: Jul. 8, 2025

(54) SYSTEM AND METHOD FOR EXPANDING A DATA TRANSFER FRAMEWORK

(71) Applicant: The Toronto-Dominion Bank, Toronto (CA)

(72) Inventors: Upal Sayeed Hossain, Toronto (CA); Paul Michael Montag, London (CA); Peter George McInnis, Etobicoke (CA); Robert Lawrence Goodman, Wilmington, DE (US)

( * ) Notice: Subject to any disclaimer, the term of this patent is extended or adjusted under 35 U.S.C. 154(b) by 64 days.

(21) Appl. No.: 17/882,993

(22) Filed: Aug. 8, 2022

(65) Prior Publication Data

US 2024/0045881 A1      Feb. 8, 2024

(51) Int. Cl.
     *G06F 16/25*      (2019.01)
     *G06F 16/28*      (2019.01)

(52) U.S. Cl.
     CPC .......... *G06F 16/254* (2019.01); *G06F 16/258* (2019.01); *G06F 16/284* (2019.01)

(58) Field of Classification Search
CPC ..... G06F 16/254; G06F 16/258; G06F 16/284
See application file for complete search history.

(56) References Cited

U.S. PATENT DOCUMENTS

| 7,681,185 | B2 * | 3/2010 | Kapoor | G06F 9/44521 |
| | | | | 717/106 |
| 8,099,725 | B2 | 1/2012 | Jin et al. | |
| 9,519,695 | B2 | 12/2016 | Sampathkumaran et al. | |
| 9,875,276 | B2 | 1/2018 | Golec et al. | |
| 10,360,006 | B2 | 7/2019 | Eguchi | |
| 10,685,033 | B1 * | 6/2020 | Searls | G06F 16/54 |
| | | | | 707/737 |
| 10,929,270 | B2 * | 2/2021 | Weis | G06F 11/3644 |
| | | | | 707/737 |
| 2003/0188300 | A1 * | 10/2003 | Patrudu | G06F 9/547 |
| | | | | 717/149 |

(Continued)

FOREIGN PATENT DOCUMENTS

| CN | 103309904 B | 12/2016 |
| CN | 113986951 A | 1/2022 |

*Primary Examiner* — Yuk Ting Choi
(74) *Attorney, Agent, or Firm* — Borden Ladner Gervais LLP; Curtis B. Behmann

(57) ABSTRACT

Apparatus and methods for expanding a data transfer framework are disclosed. Exemplary implementations may: provide an ETL framework comprising a plurality of ETL modules and comprising code including variables; obtain a configuration file including data values to replace the variables for executing selected ETL modules, and including external command data configured to execute a new data transformation external to and absent from the ETL framework, the external command data including a reference to an external module generated in relation to an external interface; and execute the one or more selected ETL modules based on the code, the data values and the external command data. Exemplary implementations provide a flexible and expandable ETL framework that enable a new type of data transformation that is not currently supported by the framework, without having to modify the framework. The framework may impart native properties and characteristics of the framework to the external module.

16 Claims, 6 Drawing Sheets

(56) References Cited

U.S. PATENT DOCUMENTS

| | | | |
|---|---|---|---|
| 2006/0230083 A1* | 10/2006 | Allyn | G06F 11/3684 |
| | | | 707/602 |
| 2017/0185661 A1* | 6/2017 | Belyy | G06F 16/119 |
| | | | 707/602 |
| 2018/0218052 A1* | 8/2018 | Cosgrove, Jr. | G06F 16/254 |
| | | | 707/602 |
| 2022/0413879 A1* | 12/2022 | Passey | G06F 9/44521 |
| | | | 707/602 |
| 2023/0104101 A1* | 4/2023 | Rodriguez | G06F 9/44521 |
| | | | 707/602 |

* cited by examiner

```
sql_module1:
{
    loggable: true
    drop.columns: ["a"]
    sql:"SELECT * FROM delta. '"${sql_module1.options.location}"'
where "${sql_module1.options.filter}
    options:
        {
            module: "data_transformation"
          method: process
            filter:partition_date \= ${partition_date},
            location:/tmp/etl/events
        }

"name": "events"

}

OR sql_module2:
Example: the SQL statement is built using environment variable
{
    sql:"SELECT * FROM delta. '"${location_from_env}"' where
"${sql_module1.options.filter}
    loggable: true
    options:
        {
            module: "data_transformation"
          module: process
            filter:partition_date \= ${partition_date},
            location:/tmp/etl/events

}

"name": "events"

}

OR sql_module:
{
        sql:"SELECT * FROM delta. '"${location_from_env}"' where
"${sql_module1.options.filter}
```

FIG. 5

```
modules: {
    external-module: {
    "externalFlag": "True", #The parameter when present as is true,
an external python script is called.
        "options":{
            "path":${dbfs_root}"/external_modules/", #Path where the
external module is located.
            "module":"test_external_module", #Name of the external
module
            "method":"external_method" #Name of the method inside
external module.
            #method signature(spark_session, config, audit, exception)
```

FIG. 6

SYSTEM AND METHOD FOR EXPANDING A DATA TRANSFER FRAMEWORK

FIELD

The present disclosure relates to data transfers, including but not limited to computing platforms, methods, and storage media for expanding a data transfer framework.

BACKGROUND

ETL (Extract, Transform and Load) is an approach for an organization to combine structured and unstructured data into a single database, data lake or other storage arrangement. An ETL process may move data from one location to another, and perform a transformation as the data is being moved. Such transformation can include examples such as joining two data sets, filtering or aggregating data based on business requirements.

Typically, a developer tool is provided to enable and leverage ETL functionality. However, such developer tools require development teams to write code for each ETL operation.

Improvements in approaches for expanding a data transfer framework are desirable.

BRIEF DESCRIPTION OF THE DRAWINGS

Embodiments of the present disclosure will now be described, by way of example only, with reference to the attached Figures.

FIG. 5 illustrates example code of a configuration file for performing a data transformation, in accordance with one or more embodiments.

FIG. 6 illustrates example code of a configuration file that accesses an external module for performing a data transformation, in accordance with one or more embodiments.

DETAILED DESCRIPTION

Figure 1:
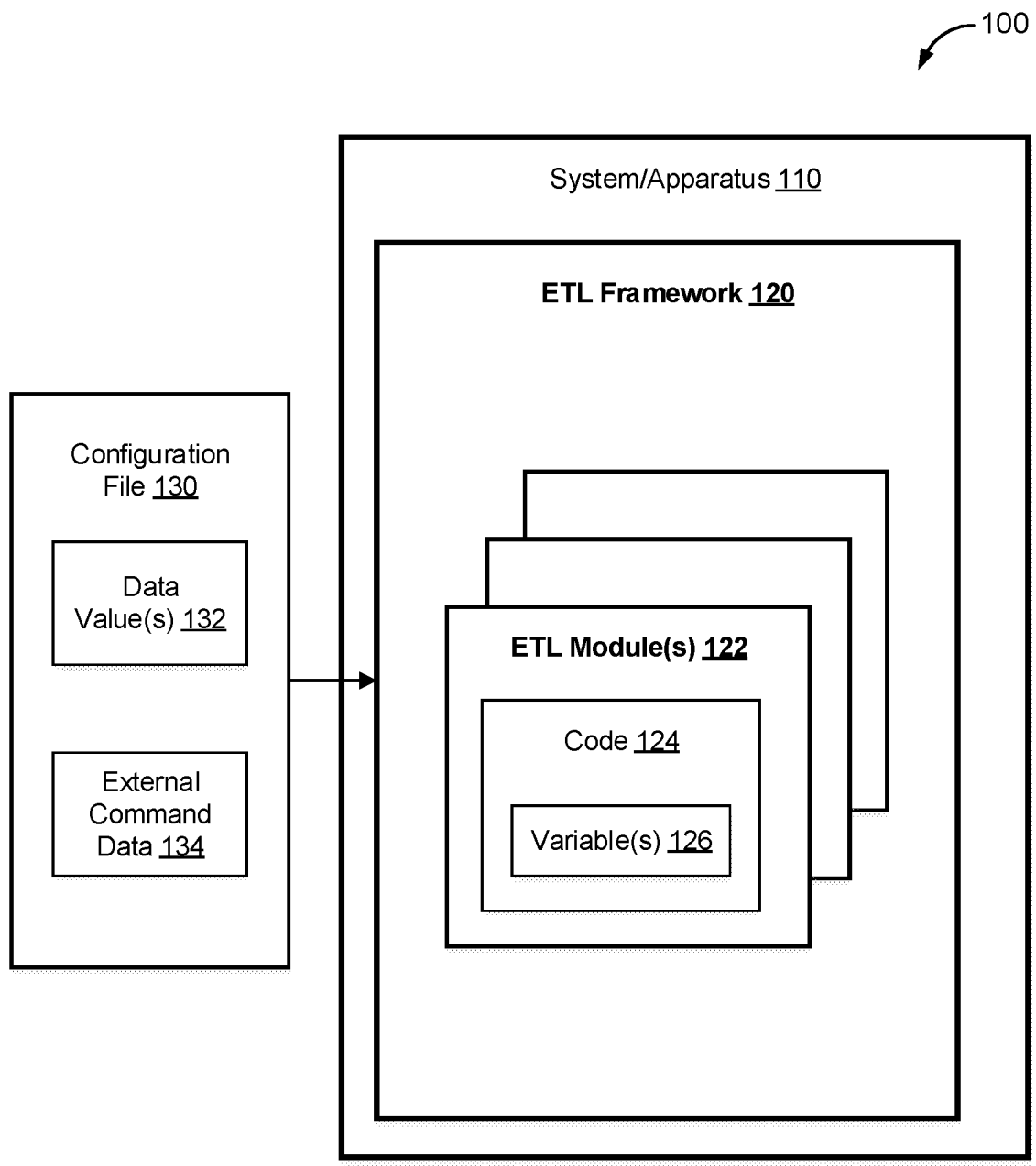
FIG. 1 illustrates a system configured for expanding a data transfer framework, in accordance with one or more embodiments.

Computing platforms, methods, and storage media for expanding a data transfer framework are disclosed. Exemplary implementations may: provide an ETL framework comprising a plurality of ETL modules and comprising code including variables; obtain a configuration file including data values to replace the variables for executing selected ETL modules, and including external command data configured to execute a new data transformation external to and absent from the ETL framework, the external command data including a reference to an external module generated in relation to an external interface; and execute the one or more selected ETL modules based on the code, the data values and the external command data. Exemplary implementations provide a flexible and expandable ETL framework that enable a new type of data transformation that is not currently supported by the framework, without having to modify the framework. The framework may impart native properties and characteristics of the framework to the external module.

Embodiments of the present disclosure provide a flexible and expandable ETL framework that integrates new functions via external command data, such as a structured query language (SQL) statement or reference to an external data module.

Known ETL approaches employ a tool that is built or coded from the ground up by developers, with different tools developed for each need. In accordance with one or more embodiments, the present disclosure provides an ETL framework that includes ETL modules and code associated with each of the ETL modules. The code includes one or more variables, and a configuration file defines data values to be used in place of the variables for executing an ETL module. The configuration file includes external command data configured to execute a new data transformation external to the ETL framework so as to expand capabilities of the ETL framework. The external command data can be a SQL statement that enables a new type of data transformation that is not currently supported by the framework, without having to modify the framework. The framework can impart native properties and characteristics of the framework to the external module.

One aspect of the present disclosure relates to a computing platform configured for expanding a data transfer framework. The computing platform may include a non-transient computer-readable storage medium having executable instructions embodied thereon. The computing platform may include one or more hardware processors configured to execute the instructions. The processor(s) may execute the instructions to provide an ETL framework including a plurality of ETL modules and including code associated with each of the plurality of ETL modules. The code may include one or more variables. The processor(s) may execute the instructions to obtain a configuration file. The configuration file may include one or more data values to be used in place of the one or more variables for execution of one or more selected ETL modules from the plurality of ETL modules. The configuration file may further include external command data configured to execute a new data transformation external to and absent from the ETL framework. The external command data may include a reference to an external module generated in relation to an external interface. The processor(s) may execute the instructions to execute the one or more selected ETL modules based on the code associated with the one or more selected ETL modules, based on the one or more data values in the configuration file, and based on the external command data.

Another aspect of the present disclosure relates to a method for expanding a data transfer framework. The method may include providing an ETL framework including a plurality of ETL modules and including code associated with each of the plurality of ETL modules. The code may include one or more variables. The method may include obtaining a configuration file. The configuration file may include one or more data values to be used in place of the one or more variables for execution of one or more selected ETL modules from the plurality of ETL modules. The configuration file may further include external command data configured to execute a new data transformation external to and absent from the ETL framework. The external command data may include a reference to an external module generated in relation to an external interface. The method may include executing the one or more selected ETL modules based on the code associated with the one or more selected ETL modules, based on the one or more data values in the configuration file, and based on the external command data.

Yet another aspect of the present disclosure relates to a non-transient computer-readable storage medium having instructions embodied thereon, the instructions being executable by one or more processors to perform a method for expanding a data transfer framework. The method may include providing an ETL framework including a plurality of ETL modules and including code associated with each of the plurality of ETL modules. The code may include one or more variables. The method may include obtaining a configuration file. The configuration file may include one or more data values to be used in place of the one or more variables for execution of one or more selected ETL modules from the plurality of ETL modules. The configuration file may further include external command data configured to execute a new data transformation external to and absent from the ETL framework. The external command data may include a reference to an external module generated in relation to an external interface. The method may include executing the one or more selected ETL modules based on the code associated with the one or more selected ETL modules, based on the one or more data values in the configuration file, and based on the external command data.

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

Certain terms used in this application and their meaning as used in this context are set forth in the description below. To the extent a term used herein is not defined, it should be given the broadest definition persons in the pertinent art have given that term as reflected in at least one printed publication or issued patent. Further, the present processes are not limited by the usage of the terms shown below, as all equivalents, synonyms, new developments and terms or processes that serve the same or a similar purpose are considered to be within the scope of the present disclosure.

FIG. 1 illustrates a computing platform 100 configured for expanding a data transfer framework, in accordance with one or more embodiments. One or more embodiments provide an ETL framework 120 that provides reusable "modules" that perform the ETL operations. The reusable modules may be provided to a development team, rather than the development team having to create custom code to perform the ETL operations. In this way, the ETL framework 120 provides improvements in the functioning of one or more computing devices implementing or executing the ETL framework, compared to one or more computing devices that would inefficiently and inflexibly execute fixed-purpose tools coded by developers.

In an implementation, a system and method of one or more embodiments obtains configuration files to move data from point A to point B. In some embodiments, the method and system create, or assist in creating, the configuration files. Alternatively, in an embodiment, the system or method obtains the configuration files. Files may include, and specify, the location of point A and point B, so that a developer does not have to write code for the data movement. It is only necessary to provide a configuration file. The associated code may be provided as part of the framework, and the framework may load the configuration file and execute on the instructions that are associated with the configuration file.

The computing platform 100 comprises an ETL system/apparatus 110 including an ETL framework 120. In an embodiment, the computing platform may include a non-transient computer-readable storage medium having executable instructions embodied thereon. The computing platform may include one or more hardware processors configured to execute the instructions. The processor(s) may execute the instructions to provide the ETL framework 120.

The ETL framework 120 comprises a plurality of ETL modules 122, each module having an associated function. Examples of functionality and associated modules include: sourcing data from a data source, such as a data lake, using a Data Sourcing module; performing data transformation using a SQL to Dataframe module; executing custom PySpark (Python API for Apache Spark™) code using an Execute External module; SCD Type 2 processing using a Load and Enrich module; and writing data to ADLS (Azure Data Lake Storage) and Synapse using a Dataframe Writer module.

According to one or more embodiments, the ETL modules 122 comprise code 124 associated with each of the plurality of ETL modules 122. The code 122 may include one or more variables 126. The processor(s) may execute the instructions to obtain a configuration file 130. The configuration file 130 may include one or more data values 132 to be used in place of the one or more variables 126 for execution of one or more selected ETL modules from the plurality of ETL modules 122.

The configuration file 130 may further include external command data 134 configured to execute a new data transformation external to and absent from the ETL framework 120. The external command data 134 may include a reference to an external module generated in relation to an external interface. The external module may be external to the ETL framework, external to and separate from the plurality of ETL modules, and/or external to one or more computing devices used to provide or execute the ETL framework and/or the ETL modules. The external interface may be external to the ETL framework, external to an interface associated with the ETL functionality, and/or external to one or more computing devices used to provide or execute the ETL framework. The processor(s) may execute the instructions to execute the one or more selected ETL modules, based on the code associated with the one or more selected ETL modules, based on the one or more data values 132 in the configuration file 130, and based on the external command data 134.

Consider an example implementation in which a data transformation module from among the ETL modules 122 is configured to obtain a configuration file 130 that supplies and executes a Spark SQL statement to perform data transformation. A Spark SQL statement expresses data transformations using standard SQL statements, for example to do one or more of: select data, filter, aggregate, change data, concatenate columns, etc. Without such a functionality provided in accordance with one or more embodiments, a developer would have to write a program and code to execute the Spark SQL statement. Instead, the ETL framework 120 in accordance with one or more embodiments takes the Spark SQL statement from the configuration file 130, and uses SQL syntax to perform data transformation, for example selecting data, filtering, aggregation, and/or changing the data. Transformations are supplied in a configuration file, for example from a developer computing device, without writing code to execute the SQL. The ETL framework 120 may provide the code to execute the SQL automatically.

In an implementation, the ETL framework 120 may be a PySpark (Python) program. The ETL framework 120 may execute a Spark SQL statement and place the results into a location. As described earlier, the ETL framework 120 may provide functionality and code including variables, and may replace the variables with the data values 132 specified in the configuration file 130.

The ETL framework 120 may also pass in the location of the SQL itself, or the location of a PySpark file, and may operate in relation to multiple files at once. The ETL modules 122 require parameters to instruct the module in relation to desired functionality, and the configuration file 130 is an example of how the data values are provided to the modules, the data values being associated with variables in the modules and intended to replace the associated variables.

Known approaches do not permit a user to specify SQL within an ETL module, and rather include only a limited number of defined transformations that it could perform. For example, a known module could tell the system to filter data, but the particular transformation would need to be specified, for example by providing filtering parameters. Such a known approach is rigid and limited to only those specified transformations; the framework itself would need to be changed to add any capabilities to known approaches.

An advantageous aspect of embodiments of the present disclosure is that the ETL framework 120 is configured to use SQL, for example as provided in the configuration file 130 from a developer computing device, to perform data transformations. This SQL functionality provides flexibility, enabling easy enhancement of the framework compared to the rigid hard-coded modifications required in known approaches. For example, in accordance with one or more embodiments, the SQL statement can be used to provide a new type of data transformation that is not currently provided or supported by the framework, without having to modify the framework itself. This improves the functioning of the computing device or processor used to implement the ETL framework 120. In accordance with one or more embodiments, a source data frame is used, for example using SQL in a configuration file.

A given ETL framework may not necessarily cover all desired ETL use cases/capabilities. Accordingly, another aspect of embodiments of the present disclosure allows development of custom code, the ETL framework is configured to execute the custom code using the framework, for example to provide common logging. This functionality allows the framework to execute custom code that a development team may write, then pass it a session for the custom code to use, and have a logging method to log activities in a standard way.

In accordance with one or more embodiments, the ETL framework 120 is configured to interact with an external interface, such as PySpark. The external interface may be external to the ETL framework, external to an interface associated with the ETL functionality, and/or external to one or more computing devices used to provide or execute the ETL framework. For example, a developer may custom code additional functionality using PySpark, and have the configuration file 130 call the external module written using PySpark. When the external module is called using the ETL framework 120, then the ETL framework's own logging and auditing functionality can be provided to and/or for the external module, without having to create separate code for the external module. In this way, embodiments of the present disclosure are configured to impart properties and characteristics of the framework, and modules native to the framework, to the external module. This functionality will be described in further detail with respect to FIG. 2 and modules 218 and 220.

In an example implementation, a developer may first use a data sourcing module to source data from a data source, such as a data lake, which may gather or ingest data from a plurality of data sources. If the developer then wants to perform a function that the ETL framework may otherwise not be configured to handle, the configuration file 130 is provided with custom code, and may utilize data that was sourced in the sourcing module. When the custom code executes, it comes back into the ETL framework. This functionality allows developers to write custom code that can still be integrated with the ETL framework and work with the other modules, enabling expansion of current functionality of the ETL framework.

As part of a data migration, there may be some applications that are already written in PySpark. Providing this additional functionality in accordance with one or more embodiments allows the framework to directly leverage and onboard the code within the ETL framework, without having to rewrite code. An approach in accordance with one or more embodiments may also make available functionality of the framework, such as logging and auditing functionality, to other programs, such as external modules written using an external interface.

In an example implementation, when the configuration file 130 calls an ETL module 122, the ETL framework 120 may pass to the external code a Spark session that may be used, along with the configuration of the job, as well as audit and exception modules. Using this functionality, a system and method in accordance with one or more embodiments enables integration of additional functionality, freeing a developer so that they not have to worry about integrating aspects such as logging and auditing, or other aspects provided with respect to the framework, into their custom code.

Figure 2:
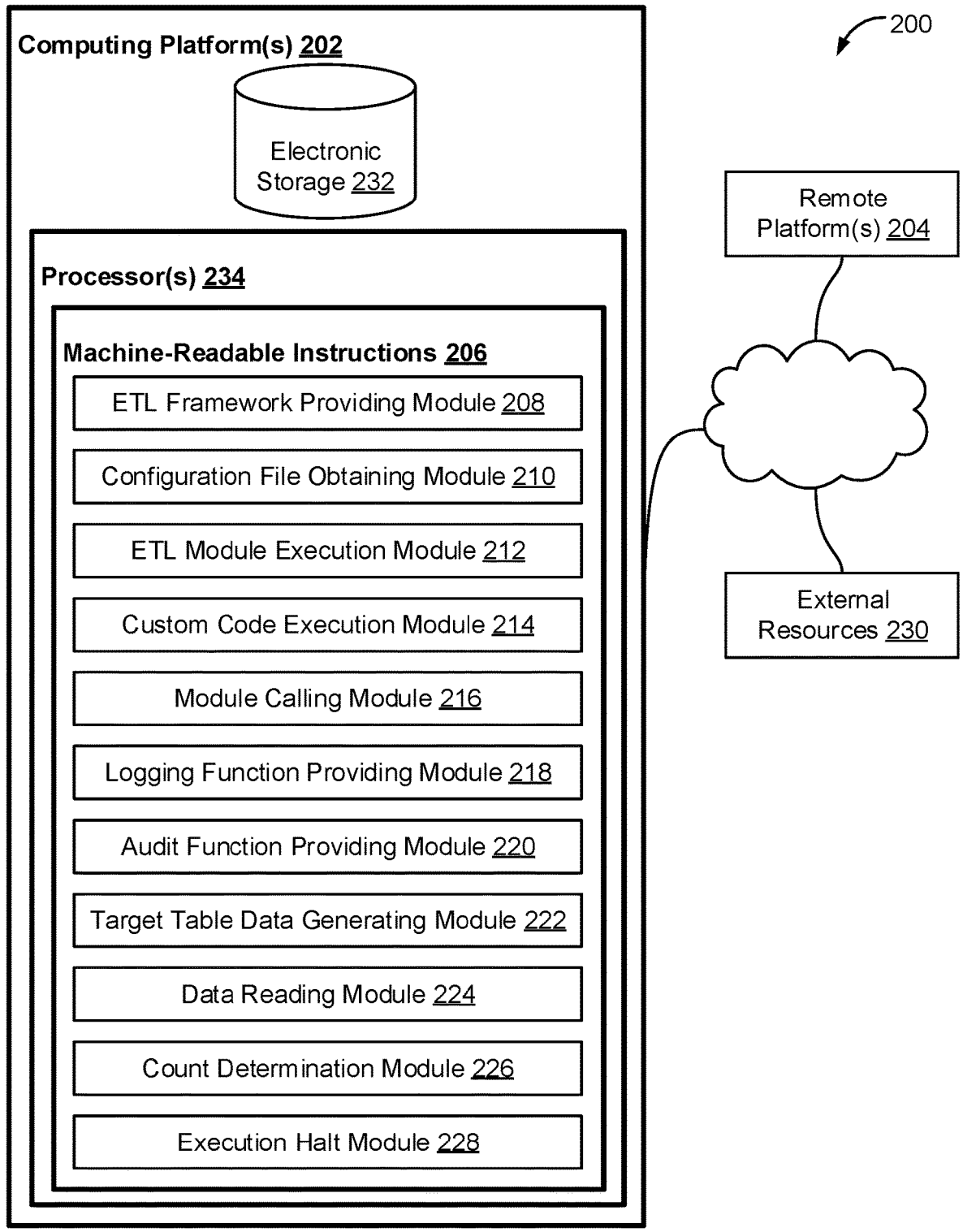
FIG. 2 illustrates another system configured for expanding a data transfer framework, in accordance with one or more embodiments.

FIG. 2 illustrates a system 200 configured for expanding a data transfer framework, in accordance with one or more embodiments. In some embodiments, system 200 may include one or more computing platforms 202. Computing platform(s) 202 may be configured to communicate with one or more remote platforms 204 according to a client/server architecture, a peer-to-peer architecture, and/or other architectures. Remote platform(s) 204 may be configured to communicate with other remote platforms via computing platform(s) 202 and/or according to a client/server architecture, a peer-to-peer architecture, and/or other architectures. Users may access system 200 via remote platform(s) 204.

Computing platform(s) 202 may be configured by machine-readable instructions 206. Machine-readable instructions 206 may include one or more instruction modules. The instruction modules may include computer program modules. The instruction modules may include one or more of ETL framework providing module 208, configuration file obtaining module 210, ETL module execution module 212, custom code execution module 214, module calling module 216, function providing module 218, audit function providing module 220, part generating module 222, data reading module 224, count determination module 226, execution halt module 228, and/or other instruction modules.

ETL framework providing module 208 may be configured to provide an ETL framework including a plurality of ETL modules and including code associated with each of the plurality of ETL modules. The code may include one or more variables.

Configuration file obtaining module 210 may be configured to obtain a configuration file. The configuration file may include source location data and destination location data with respect to a data transfer. The configuration file may include one or more data values to be used in place of the one or more variables for execution of one or more selected ETL modules from the plurality of ETL modules. The configuration file may further include external command data configured to execute a new data transformation external to and absent from the ETL framework. The external command data may be configured to perform the new data transformation such that the ETL framework is unmodified in association with performing the new data transformation.

The external command data may include a spark SQL statement expressing a data transformation using standard SQL statements. By way of non-limiting example, the data transformation may be selected from the group consisting of selecting data, filtering, aggregation, changing data. The external command data may specify an external location of a Spark SQL statement expressing a data transformation using standard SQL statements. Apache Spark is a computational engine for executing big data functions or workloads. The external location of the spark SQL statement may include a location of a PySpark file. PySpark is a Python-based API for utilizing the Spark framework. The external command data may include a reference to an external module generated in relation to an external interface.

The ETL framework may cooperate with the external module to impart native properties and characteristics of the ETL framework to the external module, for example as described later with respect to logging function providing module 218 and audit function providing module 220.

ETL module execution module 212 may be configured to execute the one or more selected ETL modules based on the code associated with the one or more selected ETL modules, based on the one or more data values in the configuration file, and based on the external command data.

Custom code execution module 214 may be configured to execute custom code, via the configuration file, and utilizing data obtained from a data-sourcing module. Module calling module 216 may be configured to call the external module using the ETL framework. Custom code execution module 214 and module calling module 216 relate to the above-described functionality of expanding existing capabilities of the ETL framework.

Logging function providing module 218 may be configured to provide a logging function to the external module. The logging function may be a native property of the ETL framework. The external module may be void of logging functionality. Logging function providing module 218 may thus impart on the external module a logging function that is absent from the external module, thereby improving functioning of a processor executing the external module, reducing the processor load and cost, as well as reducing the memory required, compared to having to modify the external module to include the logging function. In some cases, there may be technical challenges preventing the modification of the external module to include the logging function.

Also, logging function providing module 218 improves functioning of a processor executing the ETL framework, by making the processor more efficient in that the ETL framework may impart a native function on the external module without the external module having the function, reducing the processor load and cost, as well as reducing the memory required.

Audit function providing module 220 may be configured to provide an audit function to the external module. The audit function may be a native property of the ETL framework. The external module may be void of audit functionality. Audit function providing module 220 may thus impart on the external module an audit function that is absent from the external module, thereby improving functioning of a processor executing the external module, reducing the processor load and cost, as well as reducing the memory required, compared to having to modify the external module to include the audit function. In some cases, there may be technical challenges preventing the modification of the external module to include the audit function. Also, audit function providing module 220 improves functioning of a processor executing the ETL framework, by making the processor more efficient in that the ETL framework may impart a native function on the external module without the external module having the function, reducing the processor load and cost, as well as reducing the memory required.

Target table data generating module 222 may be configured to generate, as part of the executing the one or more selected ETL modules, data in a target table based on source data from a source table. The configuration file may define the source table and the target table. Data reading module 224 may be configured to read the generated data from the target table. Count determination module 226 may be configured to determine a count of records read from the target table. Execution halt module 228 may be configured to halt execution of the one or more selected ETL modules when the count of records read from the target table is zero. These modules 222, 224, 226 and 226 may cooperate to reduce processor load and cost, as well as reducing the memory required, by preventing unnecessary execution of tasks that may already be completed or may no longer be required.

In some embodiments, computing platform(s) 202, remote platform(s) 204, and/or external resources 230 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 202, remote platform(s) 204, and/or external resources 230 may be operatively linked via some other communication media.

A given remote platform 204 may include one or more processors configured to execute computer program modules. The computer program modules may be configured to enable an expert or user associated with the given remote platform 204 to interface with system 200 and/or external resources 230, and/or provide other functionality attributed herein to remote platform(s) 204. By way of non-limiting example, a given remote platform 204 and/or a given computing platform 202 may include one or more of a server, a desktop computer, a laptop computer, a handheld computer, a tablet computing platform, a NetBook, a Smartphone, a gaming console, and/or other computing platforms.

External resources 230 may include sources of information outside of system 200, external entities participating with system 200, and/or other resources. In some embodiments, some or all of the functionality attributed herein to external resources 230 may be provided by resources included in system 200.

Computing platform(s) 202 may include electronic storage 232, one or more processors 234, and/or other components. Computing platform(s) 202 may include communication lines, or ports to enable the exchange of information with a network and/or other computing platforms. Illustration of computing platform(s) 202 in FIG. 2 is not intended to be limiting. Computing platform(s) 202 may include a plurality of hardware, software, and/or firmware components operating together to provide the functionality attributed herein to computing platform(s) 202. For example, computing platform(s) 202 may be implemented by a cloud of computing platforms operating together as computing platform(s) 202.

Electronic storage 232 may comprise non-transitory storage media that electronically stores information. The electronic storage media of electronic storage 232 may include one or both of system storage that is provided integrally (i.e., substantially non-removable) with computing platform(s) 202 and/or removable storage that is removably connectable to computing platform(s) 202 via, for example, a port (e.g., a USB port, a firewire port, etc.) or a drive (e.g., a disk drive, etc.). Electronic storage 232 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 232 may include one or more virtual storage resources (e.g., cloud storage, a virtual private network, and/or other virtual storage resources). Electronic storage 232 may store software algorithms, information determined by processor(s) 234, information received from computing platform(s) 202, information received from remote platform(s) 204, and/or other information that enables computing platform(s) 202 to function as described herein.

Processor(s) 234 may be configured to provide information processing capabilities in computing platform(s) 202. As such, processor(s) 234 may include one or more of a digital processor, an analog processor, a digital circuit designed to process information, an analog circuit designed to process information, a state machine, and/or other mechanisms for electronically processing information. Although processor(s) 234 is shown in FIG. 2 as a single entity, this is for illustrative purposes only. In some embodiments, processor(s) 234 may include a plurality of processing units. These processing units may be physically located within the same device, or processor(s) 234 may represent processing functionality of a plurality of devices operating in coordination. Processor(s) 234 may be configured to execute modules 208, 210, 212, 214, 216, 218, 220, 222, 224, 226, and/or 228, and/or other modules. Processor(s) 234 may be configured to execute modules 208, 210, 212, 214, 216, 218, 220, 222, 224, 226, and/or 228, and/or other modules by software; hardware; firmware; some combination of software, hardware, and/or firmware; and/or other mechanisms for configuring processing capabilities on processor(s) 234. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 208, 210, 212, 214, 216, 218, 220, 222, 224, 226, and/or 228 are illustrated in FIG. 2 as being implemented within a single processing unit, in embodiments in which processor(s) 234 includes multiple processing units, one or more of modules 208, 210, 212, 214, 216, 218, 220, 222, 224, 226, and/or 228 may be implemented remotely from the other modules. The description of the functionality provided by the different modules 208, 210, 212, 214, 216, 218, 220, 222, 224, 226, and/or 228 described below is for illustrative purposes, and is not intended to be limiting, as any of modules 208, 210, 212, 214, 216, 218, 220, 222, 224, 226, and/or 228 may provide more or less functionality than is described. For example, one or more of modules 208, 210, 212, 214, 216, 218, 220, 222, 224, 226, and/or 228 may be eliminated, and some or all of its functionality may be provided by other ones of modules 208, 210, 212, 214, 216, 218, 220, 222, 224, 226, and/or 228. As another example, processor(s) 234 may be configured to execute one or more additional modules that may perform some or all of the functionality attributed below to one of modules 208, 210, 212, 214, 216, 218, 220, 222, 224, 226, and/or 228.

Figure 3:
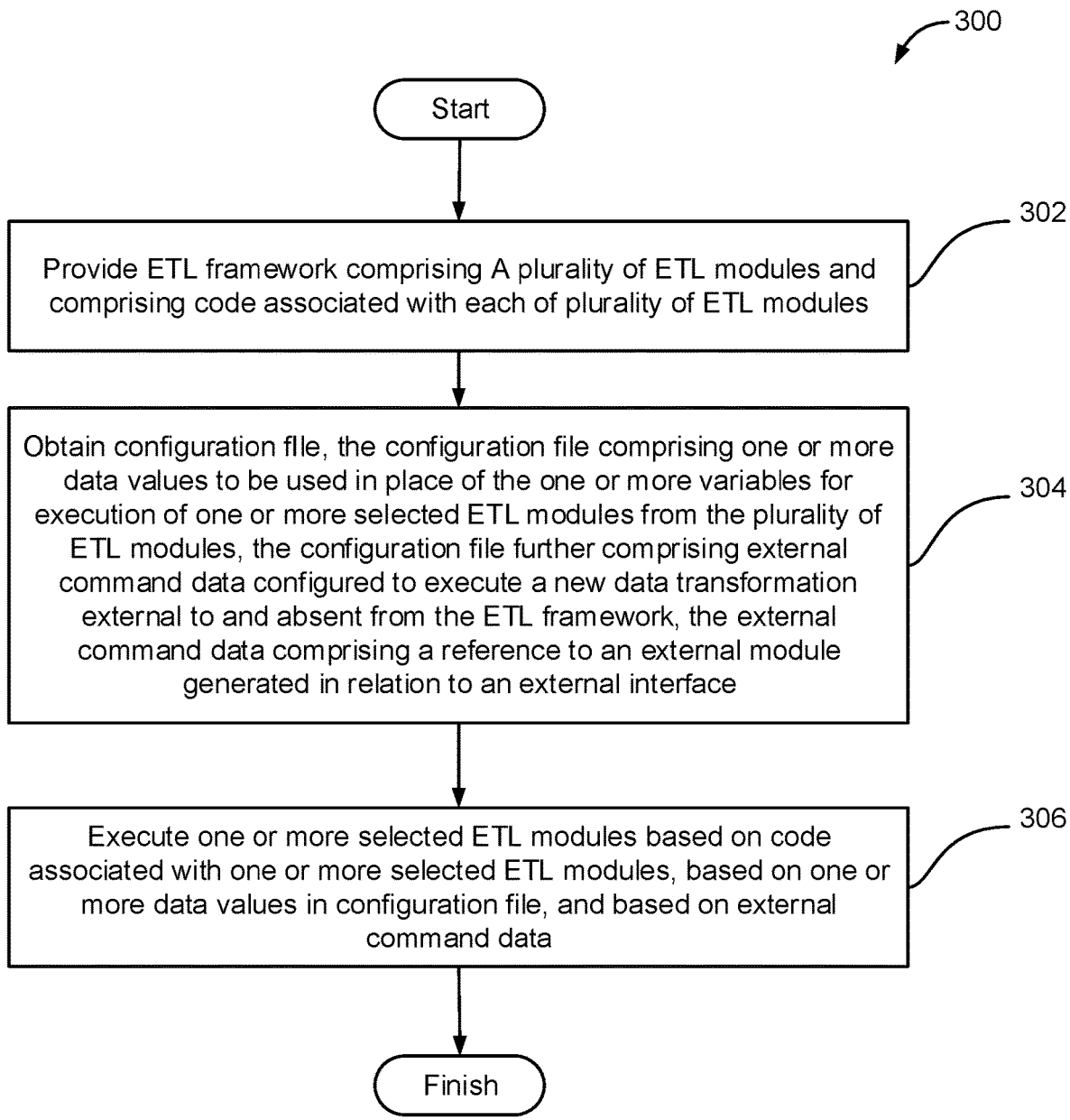
FIG. 3 illustrates a method for expanding a data transfer framework, in accordance with one or more embodiments.

FIG. 3 illustrates a method 300 for expanding a data transfer framework, in accordance with one or more embodiments. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

An operation 302 may include providing an ETL framework including a plurality of ETL modules and including code associated with each of the plurality of ETL modules. The code may include one or more variables. Operation 302 may be performed by one or more hardware processors configured by machine-readable instructions including a module that is the same as or similar to ETL framework providing module 208, in accordance with one or more embodiments.

An operation 304 may include obtaining a configuration file. The configuration file may include one or more data values to be used in place of the one or more variables for execution of one or more selected ETL modules from the plurality of ETL modules. The configuration file may further include external command data configured to execute a new data transformation external to and absent from the ETL framework. The external command data may include a reference to an external module generated in relation to an external interface. Operation 304 may be performed by one or more hardware processors configured by machine-readable instructions including a module that is the same as or similar to configuration file obtaining module 210, in accordance with one or more embodiments.

An operation 306 may include executing the one or more selected ETL modules based on the code associated with the one or more selected ETL modules, based on the one or more data values in the configuration file, and based on the external command data. Operation 306 may be performed by one or more hardware processors configured by machine-readable instructions including a module that is the same as or similar to ETL module execution module 212, in accordance with one or more embodiments.

One or more other operations as described and illustrated herein may be performed by one or more hardware processors configured by machine-readable instructions. In one or more embodiments, this may include a module that is the same as or similar to custom code execution module 214, module calling module 216, logging function providing module 218, audit function providing module 220, target table data generating module 222, data reading module 224, count determination module 226, and/or execution halt module 228, in accordance with one or more embodiments.

Figure 4:
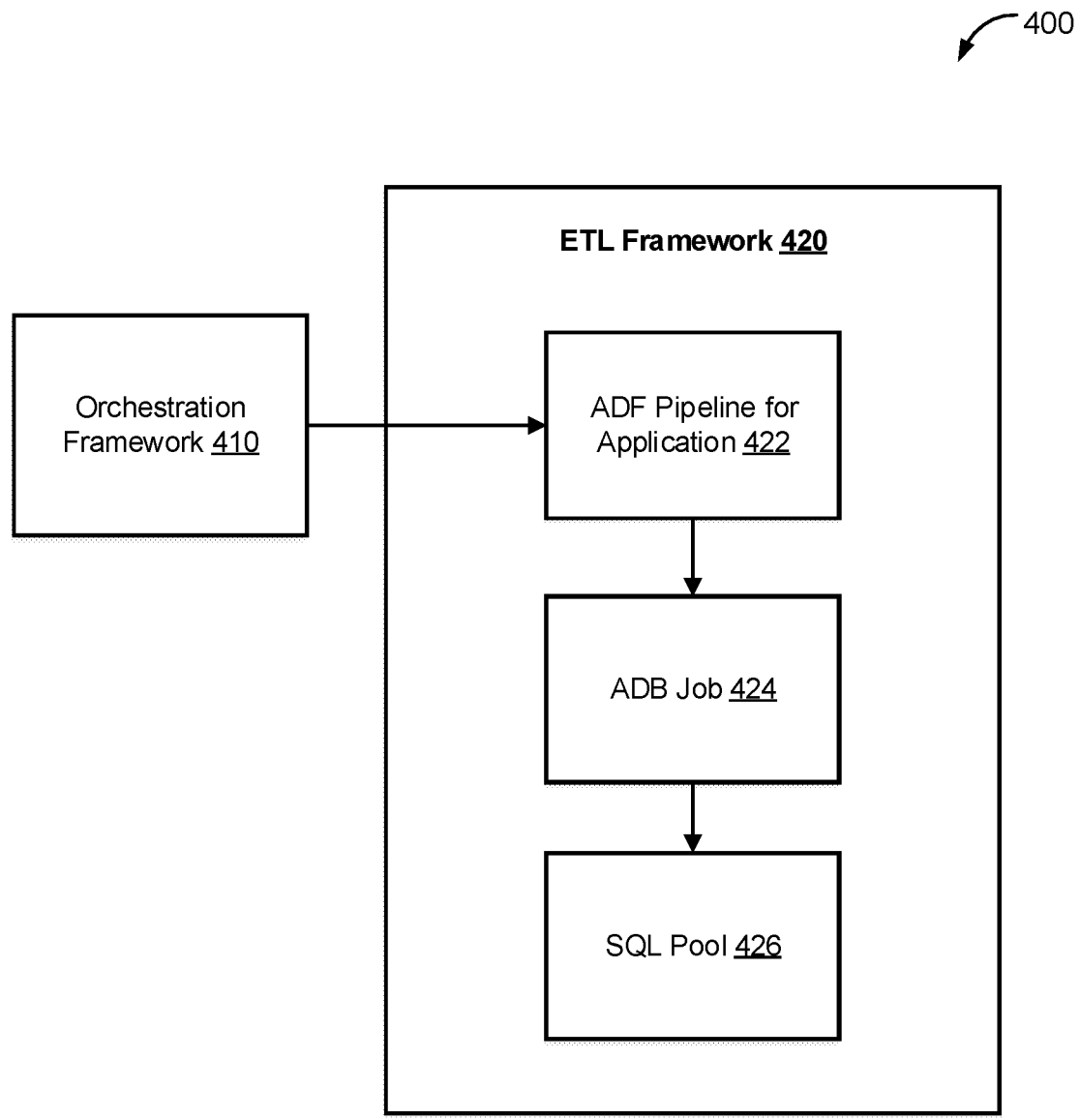
FIG. 4 illustrates a further system for expanding a data transfer framework, in accordance with one or more embodiments.

FIG. 4 illustrates a further system 400 for expanding a data transfer framework, in accordance with one or more embodiments. As a general approach, an orchestration framework 410 triggers and orchestrates data transfer jobs, and kicks off a job within an ETL framework 420. The orchestration framework 410 may call the job by passing parameters to a pipeline 422, such as an ADF pipeline for the application, and may call the core of the ETL framework 420.

According to one or more embodiments, and in relation to FIG. 4, ADB job module 424 within the ETL framework 420, may be configured to take parameters that have been collected (e.g. path to config file, etc.). Using those parameters, ADB job module 424 may obtain instructions and resolve additional parameters (e.g. run for date range, apply logic). An ADB job module 424 within the ETL framework 420 may take parameters that have been collected, get instructions and resolve additional parameters. In an embodiment, configuration information is supplied by calling one or more modules.

In an implementation, a configuration file may be supplied, for example from a developer device, by calling one or more ETL modules. The configuration file may be similar to configuration file 130 in FIG. 1. One or more configuration files may be configured to move data from point A to point B, and may use SQL to perform data transformations, for example using SQL pool 426, and may call custom code using PySpark or another external module.

FIG. 5 illustrates example code of a configuration file for performing a data transformation, in accordance with one or more embodiments. As described earlier, a configuration file is provided to supply parameters for data transformation, without writing code to execute the SQL. The configuration file, for example such as configuration file 130 in FIG. 1, may be provided to, or by, a system in accordance with one or more embodiments. The configuration file of FIG. 5 may be obtained by a system in accordance with one or more embodiments, for example from a computing device external to the system, where the configuration file may be provided by a user of the computing device.

An ETL framework in accordance with one or more embodiments comprises the code to perform ETL module functions automatically, for example based on code being provided in the ETL module(s) and based on data values in a configuration file as shown in FIG. 5. The example in FIG. 5 shows program code to call a data transformation module, and provides data values to replace variables in code associated with one or more ETL modules, such as the data transformation module. In an implementation, the ETL framework may be a PySpark (Python) program. For example, the ETL framework may be configured to execute various statements, and to place the results into a specified location, for example a location specified in the configuration file. The ETL modules may employ parameters to instruct the module what to do, and the framework may replace the variables with the values specified in the configuration file shown in FIG. 5, and using a process as described above. The framework may also pass in the location of the SQL itself, or the location of a PySpark file, and may operate with respect to multiple files at once.

FIG. 6 illustrates example code of a configuration file that accesses an external module for performing a data transformation, in accordance with one or more embodiments. The example in FIG. 6 is similar to the example in FIG. 5, but is configured to enable the ETL framework to access custom code in an external module via an external interface such as PySpark, for example to expand current functionality of the ETL framework as described earlier. Using this approach, the framework functionality may be easily expanded by referencing the custom code and being able to attribute or impart ETL framework aspects, such as logging and auditing functionality, to the custom code, since it is being run in the context of the ETL framework.

In relation to the example of FIG. 6, as described earlier in relation to other embodiments, a system may use the configuration file and/or one or more ETL modules to impart on the external module a function that is absent from the external module, thereby improving functioning of a processor executing the external module. This reduces the processor load and cost, and reduces the memory required, compared to having to modify the external module to include the function. In some cases, there may be technical challenges preventing the modification of the external module to include the function. The ETL module(s) and the configuration file cooperate to improve functioning of a processor executing the ETL framework, by making the processor more efficient in that the ETL framework may impart a native function on the external module without the external module having the function, reducing the processor load and cost, as well as reducing the memory required.

Embodiments of the present disclosure provide a flexible and expandable ETL framework that integrates new functions via external command data, such as a SQL statement or reference to an external data module. An ETL framework according to one or more embodiments includes ETL modules and code associated with each of the ETL modules. The code includes one or more variables, and a configuration file defines data values to be used in place of the variables for executing an ETL module. The configuration file includes external command data configured to execute a new data transformation external to the ETL framework so as to expand capabilities of the ETL framework. The external command data can be a SQL statement that enables a new type of data transformation that is not currently supported by the framework, without having to modify the framework. The framework can impart native properties and characteristics of the framework to the external module.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a compact disk read only memory (CD-ROM), digital versatile disk (DVD), Blu-ray Disc Read Only Memory (BD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

Embodiments of the disclosure can be described with reference to the following CLAUSES, with specific features laid out in the dependent clauses:

One aspect of the present disclosure relates to a system configured for expanding a data transfer framework. The system may include one or more hardware processors configured by machine-readable instructions. The processor(s) may be configured to provide an ETL framework including a plurality of ETL modules and including code associated with each of the plurality of ETL modules. The code may include one or more variables. The processor(s) may be configured to obtain a configuration file. The configuration file may include one or more data values to be used in place of the one or more variables for execution of one or more selected ETL modules from the plurality of ETL modules. The configuration file may further include external command data configured to execute a new data transformation external to and absent from the ETL framework. The external command data may include a reference to an external module generated in relation to an external interface. The processor(s) may be configured to execute the one or more selected ETL modules based on the code associated with the one or more selected ETL modules, based on the one or more data values in the configuration file, and based on the external command data.

In some implementations of the system, the external command data may be configured to perform the new data transformation such that the ETL framework is unmodified in association with performing the new data transformation.

In some implementations of the system, the configuration file may include source location data and destination location data with respect to a data transfer.

In some implementations of the system, the processor(s) may be configured to execute custom code, via the configuration file, and utilizing data obtained from a data-sourcing module.

In some implementations of the system, the external command data may include a spark SQL statement expressing a data transformation using standard SQL statements.

In some implementations of the system, the data transformation may be selected from the group consisting of selecting data, filtering, aggregation, changing data.

In some implementations of the system, the data transformation may be selected from the group consisting of selecting data, filtering, aggregation, changing data.

In some implementations of the system, the external command data may specify an external location of a spark SQL statement expressing a data transformation using standard SQL statements.

In some implementations of the system, the external location of the spark SQL statement may include a location of a PySpark file.

In some implementations of the system, the ETL framework may cooperate with the external module to impart native properties and characteristics of the ETL framework to the external module.

In some implementations of the system, the processor(s) may be configured to call the external module using the ETL framework. In some implementations of the system, the processor(s) may be configured to provide a logging function to the external module. In some implementations of the system, the may log function being a native property of the ETL framework. In some implementations of the system, the external module may be void of logging functionality.

In some implementations of the system, the processor(s) may be configured to call the external module using the ETL framework. In some implementations of the system, the processor(s) may be configured to provide an audit function to the external module. In some implementations of the system, the audit function may be a native property of the ETL framework. In some implementations of the system, the external module may be void of audit functionality.

In some implementations of the system, the processor(s) may be configured to generate, as part of the executing the one or more selected ETL modules, data in a target table based on source data from a source table. In some implementations of the system, the configuration file may define the source table and the target table. In some implementations of the system, the processor(s) may be configured to read the generated data from the target table. In some implementations of the system, the processor(s) may be configured to determine a count of records read from the target table. In some implementations of the system, the processor(s) may be configured to halt execution of the one or more selected ETL modules when the count of records read from the target table is zero.

Another aspect of the present disclosure relates to a method for expanding a data transfer framework. The method may include providing an ETL framework including a plurality of ETL modules and including code associated with each of the plurality of ETL modules. The code may include one or more variables. The method may include obtaining a configuration file. The configuration file may include one or more data values to be used in place of the one or more variables for execution of one or more selected ETL modules from the plurality of ETL modules. The configuration file may further include external command data configured to execute a new data transformation external to and absent from the ETL framework. The external command data may include a reference to an external module generated in relation to an external interface. The method may include executing the one or more selected ETL modules based on the code associated with the one or more selected ETL modules, based on the one or more data values in the configuration file, and based on the external command data.

In some implementations of the method, the external command data may be configured to perform the new data transformation such that the ETL framework is unmodified in association with performing the new data transformation.

In some implementations of the method, the configuration file may include source location data and destination location data with respect to a data transfer.

In some implementations of the method, it may include executing custom code, via the configuration file, and utilizing data obtained from a data-sourcing module.

In some implementations of the method, the external command data may include a spark SQL statement expressing a data transformation using standard SQL statements.

In some implementations of the method, the data transformation may include a is selected from the group consisting of selecting data, filtering, aggregation, changing data.

In some implementations of the method, the data transformation may be selected from the group consisting of selecting data, filtering, aggregation, changing data.

In some implementations of the method, the external command data may specify an external location of a spark SQL statement expressing a data transformation using standard SQL statements.

In some implementations of the method, the external location of the spark SQL statement may include a location of a PySpark file.

In some implementations of the method, the ETL framework may cooperate with the external module to impart native properties and characteristics of the ETL framework to the external module.

In some implementations of the method, it may include calling the external module using the ETL framework. In some implementations of the method, it may include providing a logging function to the external module. In some implementations of the method, the may log function being a native property of the ETL framework. In some implementations of the method, the external module may be void of logging functionality.

In some implementations of the method, it may include calling the external module using the ETL framework. In some implementations of the method, it may include providing an audit function to the external module. In some implementations of the method, the audit function may be a native property of the ETL framework. In some implementations of the method, the external module may be void of audit functionality.

In some implementations of the method, it may include generating, as part of the executing the one or more selected ETL modules, data in a target table based on source data from a source table. In some implementations of the method, the configuration file may define the source table and the target table. In some implementations of the method, it may include reading the generated data from the target table. In some implementations of the method, it may include determining a count of records read from the target table. In some implementations of the method, it may include halting execution of the one or more selected ETL modules when the count of records read from the target table is zero.

Yet another aspect of the present disclosure relates to a non-transient computer-readable storage medium having instructions embodied thereon, the instructions being executable by one or more processors to perform a method for expanding a data transfer framework. The method may include providing an ETL framework including a plurality of ETL modules and including code associated with each of the plurality of ETL modules. The code may include one or more variables. The method may include obtaining a configuration file. The configuration file may include one or more data values to be used in place of the one or more variables for execution of one or more selected ETL modules from the plurality of ETL modules. The configuration file may further include external command data configured to execute a new data transformation external to and absent from the ETL framework. The external command data may include a reference to an external module generated in relation to an external interface. The method may include executing the one or more selected ETL modules based on the code associated with the one or more selected ETL modules, based on the one or more data values in the configuration file, and based on the external command data.

In some implementations of the computer-readable storage medium, the external command data may be configured to perform the new data transformation such that the ETL framework is unmodified in association with performing the new data transformation.

In some implementations of the computer-readable storage medium, the configuration file may include source location data and destination location data with respect to a data transfer.

In some implementations of the computer-readable storage medium, the method may include executing custom code, via the configuration file, and utilizing data obtained from a data-sourcing module.

In some implementations of the computer-readable storage medium, the external command data may include a spark SQL statement expressing a data transformation using standard SQL statements.

In some implementations of the computer-readable storage medium, the data transformation may include a is selected from the group consisting of selecting data, filtering, aggregation, changing data.

In some implementations of the computer-readable storage medium, the data transformation may be selected from the group consisting of selecting data, filtering, aggregation, changing data.

In some implementations of the computer-readable storage medium, the external command data may specify an external location of a spark SQL statement expressing a data transformation using standard SQL statements.

In some implementations of the computer-readable storage medium, the external location of the spark SQL statement may include a location of a PySpark file.

In some implementations of the computer-readable storage medium, the ETL framework may cooperate with the external module to impart native properties and characteristics of the ETL framework to the external module.

In some implementations of the computer-readable storage medium, the method may include calling the external module using the ETL framework. In some implementations of the computer-readable storage medium, the method may include providing a logging function to the external module. In some implementations of the computer-readable storage medium, the may log function being a native property of the ETL framework. In some implementations of the computer-readable storage medium, the external module may be void of logging functionality.

In some implementations of the computer-readable storage medium, the method may include calling the external module using the ETL framework. In some implementations of the computer-readable storage medium, the method may include providing an audit function to the external module.

In some implementations of the computer-readable storage medium, the audit function may be a native property of the ETL framework. In some implementations of the computer-readable storage medium, the external module may be void of audit functionality.

In some implementations of the computer-readable storage medium, the method may include generating, as part of the executing the one or more selected ETL modules, data in a target table based on source data from a source table. In some implementations of the computer-readable storage medium, the configuration file may define the source table and the target table. In some implementations of the computer-readable storage medium, the method may include reading the generated data from the target table. In some implementations of the computer-readable storage medium, the method may include determining a count of records read from the target table. In some implementations of the computer-readable storage medium, the method may include halting execution of the one or more selected ETL modules when the count of records read from the target table is zero.

Still another aspect of the present disclosure relates to a system configured for expanding a data transfer framework. The system may include means for providing an ETL framework including a plurality of ETL modules and including code associated with each of the plurality of ETL modules. The code may include one or more variables. The system may include means for obtaining a configuration file. The configuration file may include one or more data values to be used in place of the one or more variables for execution of one or more selected ETL modules from the plurality of ETL modules. The configuration file may further include external command data configured to execute a new data transformation external to and absent from the ETL framework. The external command data may include a reference to an external module generated in relation to an external interface. The system may include means for executing the one or more selected ETL modules based on the code associated with the one or more selected ETL modules, based on the one or more data values in the configuration file, and based on the external command data.

In some implementations of the system, the external command data may be configured to perform the new data transformation such that the ETL framework is unmodified in association with performing the new data transformation.

In some implementations of the system, the configuration file may include source location data and destination location data with respect to a data transfer.

In some implementations of the system, the system may include means for executing custom code, via the configuration file, and utilizing data obtained from a data-sourcing module.

In some implementations of the system, the external command data may include a spark SQL statement expressing a data transformation using standard SQL statements.

In some implementations of the system, the data transformation may include a is selected from the group consisting of selecting data, filtering, aggregation, changing data.

In some implementations of the system, the data transformation may be selected from the group consisting of selecting data, filtering, aggregation, changing data.

In some implementations of the system, the external command data may specify an external location of a spark SQL statement expressing a data transformation using standard SQL statements.

In some implementations of the system, the external location of the spark SQL statement may include a location of a PySpark file.

In some implementations of the system, the ETL framework may cooperate with the external module to impart native properties and characteristics of the ETL framework to the external module.

In some implementations of the system, the system may include means for calling the external module using the ETL framework. In some implementations of the system, the system may include means for providing a logging function to the external module. In some implementations of the system, the may log function being a native property of the ETL framework. In some implementations of the system, the external module may be void of logging functionality.

In some implementations of the system, the system may include means for calling the external module using the ETL framework. In some implementations of the system, the system may include means for providing an audit function to the external module. In some implementations of the system, the audit function may be a native property of the ETL framework. In some implementations of the system, the external module may be void of audit functionality.

In some implementations of the system, the system may include means for generating, as part of the executing the one or more selected ETL modules, data in a target table based on source data from a source table. In some implementations of the system, the configuration file may define the source table and the target table. In some implementations of the system, the system may include means for reading the generated data from the target table. In some implementations of the system, the system may include means for determining a count of records read from the target table. In some implementations of the system, the system may include means for halting execution of the one or more selected ETL modules when the count of records read from the target table is zero.

Even another aspect of the present disclosure relates to a computing platform configured for expanding a data transfer framework. The computing platform may include a non-transient computer-readable storage medium having executable instructions embodied thereon. The computing platform may include one or more hardware processors configured to execute the instructions. The processor(s) may execute the instructions to provide an ETL framework including a plurality of ETL modules and including code associated with each of the plurality of ETL modules. The code may include one or more variables. The processor(s) may execute the instructions to obtain a configuration file. The configuration file may include one or more data values to be used in place of the one or more variables for execution of one or more selected ETL modules from the plurality of ETL modules. The configuration file may further include external command data configured to execute a new data transformation external to and absent from the ETL framework. The external command data may include a reference to an external module generated in relation to an external interface. The processor(s) may execute the instructions to execute the one or more selected ETL modules based on the code associated with the one or more selected ETL modules, based on the one or more data values in the configuration file, and based on the external command data.

In some implementations of the computing platform, the external command data may be configured to perform the new data transformation such that the ETL framework is unmodified in association with performing the new data transformation.

In some implementations of the computing platform, the configuration file may include source location data and destination location data with respect to a data transfer.

In some implementations of the computing platform, the processor(s) may execute the instructions to execute custom code, via the configuration file, and utilizing data obtained from a data-sourcing module.

In some implementations of the computing platform, the external command data may include a spark SQL statement expressing a data transformation using standard SQL statements.

In some implementations of the computing platform, the data transformation may include a is selected from the group consisting of selecting data, filtering, aggregation, changing data.

In some implementations of the computing platform, the data transformation may be selected from the group consisting of selecting data, filtering, aggregation, changing data.

In some implementations of the computing platform, the external command data may specify an external location of a spark SQL statement expressing a data transformation using standard SQL statements.

In some implementations of the computing platform, the external location of the spark SQL statement may include a location of a PySpark file.

In some implementations of the computing platform, the ETL framework may cooperate with the external module to impart native properties and characteristics of the ETL framework to the external module.

In some implementations of the computing platform, the processor(s) may execute the instructions to call the external module using the ETL framework. In some implementations of the computing platform, the processor(s) may execute the instructions to provide a logging function to the external module. In some implementations of the computing platform, the may log function being a native property of the ETL framework. In some implementations of the computing platform, the external module may be void of logging functionality.

In some implementations of the computing platform, the processor(s) may execute the instructions to call the external module using the ETL framework. In some implementations of the computing platform, the processor(s) may execute the instructions to provide an audit function to the external module. In some implementations of the computing platform, the audit function may be a native property of the ETL framework. In some implementations of the computing platform, the external module may be void of audit functionality.

In some implementations of the computing platform, the processor(s) may execute the instructions to generate, as part of the executing the one or more selected ETL modules, data in a target table based on source data from a source table. In some implementations of the computing platform, the configuration file may define the source table and the target table. In some implementations of the computing platform, the processor(s) may execute the instructions to read the generated data from the target table. In some implementations of the computing platform, the processor(s) may execute the instructions to determine a count of records read from the target table. In some implementations of the computing platform, the processor(s) may execute the instructions to halt execution of the one or more selected ETL modules when the count of records read from the target table is zero.

The invention claimed is:

1. An apparatus configured for processing instructions associated with one or more data transfers, the apparatus comprising:

a non-transient computer-readable storage medium having executable instructions embodied thereon; and
one or more hardware processors configured to execute the instructions to:
provide an ETL (extract, transform, load) framework comprising a plurality of ETL modules and comprising code, wherein each ETL module is associated with a respective portion of the code of the ETL framework, the respective portion of the code associated with each ELT module includes one or more variables;
obtain a configuration file, the configuration file comprising a selection of one or more of the plurality of ETL modules and one or more data values to be used in place of the one or more variables of the portion of the code associated with each of the one or more selected ETL modules when executing the portion of the code associated with each of the one or more selected ETL modules, the configuration file further comprising external command data configured to execute a new data transformation external to and absent from the ETL framework, the external command data comprising a reference to an external module generated in relation to an external interface;
for each of the selected one or more ETL modules, replace the one or more variables in the respective portion of the code associated with each of the selected one or more ETL modules with the corresponding one or more data values from the configuration file, and execute the portions of the code associated with the selected one or more ETL modules, based on the one or more data values in the configuration file, and based on the external command data;
generate, as part of the executing the one or more selected ETL modules, data in a target table based on source data from a source table, the configuration file defining the source table and the target table;
read the generated data from the target table;
determine a count of records read from the target table; and
halt execution of the one or more selected ETL modules when the count of records read from the target table is zero wherein the external command data specifies an external location of a Spark SQL (structured query language) statement expressing a data transformation using standard SQL statements; and
wherein the external command data specifies an external location of a Spark SQL (structured query language) statement expressing a data transformation using standard SQL statement.

2. The apparatus of claim 1 wherein:
the external command data is configured to perform the new data transformation such that the ETL framework is unmodified in association with performing the new data transformation.

3. The apparatus of claim 1 wherein:
the external command data comprises a Spark SQL (structured query language) statement expressing a data transformation using standard SQL statements.

4. The apparatus of claim 3 wherein:
the data transformation is selected from the group consisting of: selecting data, filtering, aggregation, changing data.

5. The apparatus of claim 1 wherein:
the ETL framework cooperates with the external module to impart native properties and characteristics of the ETL framework to the external module.

6. The apparatus of claim 5 wherein the one or more hardware processors are further configured to execute the instructions to:
    call the external module using the ETL framework;
    provide a logging function to the external module, the logging function being a native property of the ETL framework, and the external module being void of logging functionality.

7. The apparatus of claim 5 wherein the one or more hardware processors are further configured to execute the instructions to:
    call the external module using the ETL framework;
    provide an audit function to the external module, the audit function being a native property of the ETL framework, and the external module being void of audit functionality.

8. A computer-implemented method for expanding a data transfer framework, the method comprising:
    providing an ETL (extract, transform, load) framework comprising a plurality of ETL modules and comprising code, wherein each ETL module is associated with a respective portion of the code of the ETL framework, the respective portion of the code associated with each ELT module includes one or more variables;
    obtaining a configuration file, the configuration file comprising a selection of one or more of the plurality of ETL modules and one or more data values to be used in place of the one or more variables of the portion of the code associated with each of the one or more selected ETL modules when executing the portion of the code associated with each of the one or more selected ETL modules, the configuration file further comprising external command data configured to execute a new data transformation external to and absent from the ETL framework, the external command data comprising a reference to an external module generated in relation to an external interface;
    for each of the selected one or more ETL modules, replacing the one or more variables in the respective portion of the code associated with each of the selected one or more ETL modules with the corresponding one or more data values from the configuration file, and executing the portions of the code associated with the selected one or more ETL modules, based on the one or more data values in the configuration file, and based on the external command data;
    generating, as part of the executing the one or more selected ETL modules, data in a target table based on source data from a source table, the configuration file defining the source table and the target table;
    reading the generated data from the target table;
    determining a count of records read from the target table; and
    halting execution of the one or more selected ETL modules when the count of records read from the target table is zero; and
    wherein the external command data specifies an external location of a Spark SQL (structured query language) statement expressing a data transformation using standard SQL statement.

9. The method of claim 8 wherein:
    the external command data is configured to perform the new data transformation such that the ETL framework is unmodified in association with performing the new data transformation.

10. The method of claim 8 wherein:
    the external command data comprises a Spark SQL (structured query language) statement expressing a data transformation using standard SQL statements.

11. The method of claim 10 wherein:
    the data transformation is selected from the group consisting of: selecting data, filtering, aggregation, changing data.

12. The method of claim 8 wherein:
    the ETL framework cooperates with the external module to impart native properties and characteristics of the ETL framework to the external module.

13. The method of claim 12 further comprising:
    calling the external module using the ETL framework;
    providing a logging function to the external module, the logging function being a native property of the ETL framework, and the external module being void of logging functionality.

14. The method of claim 12 further comprising:
    calling the external module using the ETL framework;
    providing an audit function to the external module, the audit function being a native property of the ETL framework, and the external module being void of audit functionality.

15. A non-transient computer-readable storage medium having instructions embodied thereon, the instructions being executable by one or more processors to perform a method for providing data access, the method comprising:
    providing an ETL (extract, transform, load) framework comprising a plurality of ETL modules and comprising code, wherein each ETL module is associated with a respective portion of the code of the ETL framework, the respective portion of the code associated with each ELT module includes one or more variables;
    obtaining a configuration file, the configuration file comprising a selection of one or more of the plurality of ETL modules and one or more data values to be used in place of the one or more variables of the portion of the code associated with each of the one or more selected ETL modules when executing the portion of the code associated with each of the one or more selected ETL modules, the configuration file further comprising external command data configured to execute a new data transformation external to and absent from the ETL framework, the external command data comprising a reference to an external module generated in relation to an external interface;
    for each of the selected one or more ETL modules, replacing the one or more variables in the respective portion of the code associated with each of the selected one or more ETL modules with the corresponding one or more data values from the configuration file, and executing the portions of the code associated with the selected one or more ETL modules, based on the one or more data values in the configuration file, and based on the external command data;
    generating, as part of the executing the one or more selected ETL modules, data in a target table based on source data from a source table, the configuration file defining the source table and the target table;
    reading the generated data from the target table;
    determining a count of records read from the target table; and
    halting execution of the one or more selected ETL modules when the count of records read from the target table is zero; and wherein the external command data specifies an external location of a Spark SQL (structured query language) statement expressing a data transformation using standard SQL statement.

16. The non-transient computer-readable storage medium of claim 15 wherein:
the ETL framework cooperates with the external module to impart native properties and characteristics of the ETL framework to the external module.

* * * * *